United States Patent [19]

McBrearty

[11] Patent Number: 5,799,187
[45] Date of Patent: Aug. 25, 1998

[54] SYSTEM AND METHOD FOR CREATING AND MAINTAINING A CD ROM CLIENT IN A COMPUTER NETWORK

[75] Inventor: Gerald Francis McBrearty, Austin, Tex.

[73] Assignee: International Business Machines Corporation, Armonk, N.Y.

[21] Appl. No.: 656,992

[22] Filed: May 28, 1996

[51] Int. Cl.$^6$ .................................................. G06F 9/06
[52] U.S. Cl. ................................. 395/652; 395/200.52
[58] Field of Search .................... 395/651, 652, 395/653, 200.5, 200.51, 200.52, 712

[56] References Cited

U.S. PATENT DOCUMENTS 5,012,407  4/1991  Finn .
5,121,345  6/1992  Lentz .
5,325,532  6/1994  Crosswy et al. .
5,675,748  10/1997  Ross ........................................ 395/651

*Primary Examiner*—Kevin A. Kriess
*Attorney, Agent, or Firm*—Robert M. Carwell

[57] ABSTRACT

During an initial install process for CD ROM client machines in a computer network, a local client hard drive file system is set up and populated from the CD ROM with client-specific files. Subsequent network-generic and client-specific updates are distributed on CD ROM. Upon subsequent boots from these CD ROMs, the client determines which code on the CD ROM is network-generic and which is client-specific, loading only the latter on the client hard drive(s) and accessing the network-generic code from the CD ROM only.

15 Claims, 4 Drawing Sheets

SYSTEM AND METHOD FOR CREATING AND MAINTAINING A CD ROM CLIENT IN A COMPUTER NETWORK

TECHNICAL FIELD

This invention relates to installation and maintenance of computer networks and, in particular, relates to systems and methods for installing and maintaining client stations in such networks.

BACKGROUND OF THE INVENTION

In modern computer networks, heterogeneous client environments are frequently present. These result from many factors, such as differing ages and capabilities of client machines and diverse needs of their users, etc. Examples of instances of these diverse environments include differing model numbers of machines, varying sizes of hard drives, differing versions of operating systems and applications, unique user configurations, and the like.

In the ideal world, in most instances it would be desirable in order to ease network management and administration to ensure that all such clients be replicated identically with the same level of operating system, the same suite of applications, etc. However, such is not a realistic expectation, resulting oftentimes in a veritable nightmare for systems administrators charged with maintaining these clients.

It is not at all unusual when updating from one point release to another of an operating system on a client station, for example, to require perhaps two or three hours of time in order to perform such an upgrade. This not only is very time consuming but physically very trying in that a modern complex operating system might be distributed on as many as 20 or 30 diskettes, requiring that they be repeatedly swapped in and out of disk drives. When one considers that a not particularly large network of client stations by modern standards might comprise 100 or 200 client machines with many different sets of these diskettes, it may readily be appreciated how daunting the task is to maintain such client stations.

The price of CD ROM drives has continued to fall to the point where it is becoming affordable to have them as standard equipment on client stations. With the advent of such CD ROMs having a typical information density in excess of 600 megabytes per CD, the advantages of this form of distribution become apparent. This has resulted in the use of such CD ROMs for purposes of installing and maintaining operating system and other code on networks which is necessary for maintaining the client stations. However, this in itself by no means resulted in a comprehensive solution for the network administrator.

It is conventional, for example, to utilize such CD ROMs simply to update every client's hard drive from the CD ROM with generic operating system executables which have no localized component, e.g., no real need to maintain a local copy thereof on the user's hard drive. This in turn resulted in the increasing need for larger and larger hard drives for each client station which, in even moderately sized networks, can become a significant cost.

Thus, in summary, in prior methods of attempting to keep the client current, in a UNIX context, for example, the system simply would pull entire parts of the /USR file system, e.g., all the generic operating system files off the CD and install such /USR files of the operating system on the local hard drive. Not only did this approach require inordinately large and expensive hard drives for each client, but, inasmuch as the /USR files are resident on the client, this entailed an unnecessary and greater amount time and effort in updating the /USR file system which had been transferred from the CD ROM to the local hard drive.

For the foregoing reasons, in order to avoid installation of such huge amounts of code to local user hard drives (thereby reducing the amount of space available for the specific individual needs of each user), attempts were made to maintain as much as possible of the "generic" operating system code (e.g., that which was required by all clients on the network) in one or more servers. In this manner, only such servers needed to be updated with subsequent enhancements or fixes to the operating system.

While this might appear to be an effective solution to the aforementioned problem of cluttering each client user's limited hard drive space with the same operating system upgrade or bug fix code, such a solution was vulnerable to very serious drawbacks. The most obvious of these, perhaps, is that when the network itself experienced downtime, this of necessity therefore essentially crippled all client stations whereby they were essentially rendered useless.

Yet another problem has presented itself as the complexity of networks and sophistication of users thereof has increased over time. It is now not at all unusual to encounter client users who operate on a daily basis with multiple operating system environments. Thus, the aforementioned problems are only compounded in such instances wherein multiple operating systems must be maintained.

Thus the industry sorely needed a more effective way to deal with the installation and maintenance of client machines in computer network systems.

SUMMARY OF THE INVENTION

A CD ROM is produced for client stations of a computer network which will include the base generic operating system code as well as, from time to time, updates thereto. When such a client station is to be initially installed, boot code is read from the CD ROM, the local file system is created on the local hard drive(s) of the client and mounted. Thereafter this local file system is populated with localized files, e.g., client machine-specific, customized information including local configuration data, reboot information, logical volume manager information, TCP/IP addresses, etc.

Next the CD ROM's file system is mounted on the local hard drive of the clients over the previously created and populated file system that was installed on the local hard drive. The boot process then continues to completion. It is an important feature of the invention that the generic operating system code which is common to operation of all clients including the boot code, /USR, etc. is not installed on the local hard files of the clients but rather it will continue to reside on each client's CD ROM.

Upon a subsequent booting of the same client machine (whether for purposes of an updated install or merely to run the client) the most current CD ROM is inserted in the client's CD ROM drive and the system booted from the boot code on the CD ROM. However, this time the prior step (initial client install of creating and populating the local file system and partitions) is skipped because it is detected that it was effected during the prior install. Mounts are completed and the boot process continued, whereupon files on the local hard drive and CD ROM are then compared to determine if the presently running CD ROM contains a newer version of the operating system, fixes, or new function, e.g., anything which might change the client environment. If so, these operating system updates are applied to the local hard drive partitions, and the boot process continues, however code generic to multiple clients remains on the CD ROM and is not copied over to each client's hard drive(s). If no such change to the client environment is required, the boot process continues without updating the local hard drive.

In either event the CD ROM client creator/maintainer subsystem of the invention then queries to determine if code pertinent to another operating system is present on the CD ROM and if so, whether installation on the client hard drive of any code pertinent to that next operating system is warranted. If so, the subsystem determines the amount of free space on the client's hard drive(s), and queries with respect to this next operating system whether anything new is present on the CD ROM which would change the client environment relative to this second operating system and require modification of the client hard drive(s). If so, similar to the process for the first operating system, the subsystem then applies these updates to this second operating system to the local hard drive partitions, whereupon the boot process continues. However, as in the prior case, generic code such as operating system executables (mail handlers, etc.) remains on the CD ROM uncopied to the hard drives. Again, the subsystem determines whether any other operating systems are present. Upon completion of this looping process wherein no remaining updates are present to be copied to the hard drive(s), the system is thus completely updated, and transforms to an operating mode wherein the desired user specified application programs may be executed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying figures, wherein:

DETAILED DESCRIPTION OF THE PREFERRED EMBODIMENT

Figure 1:
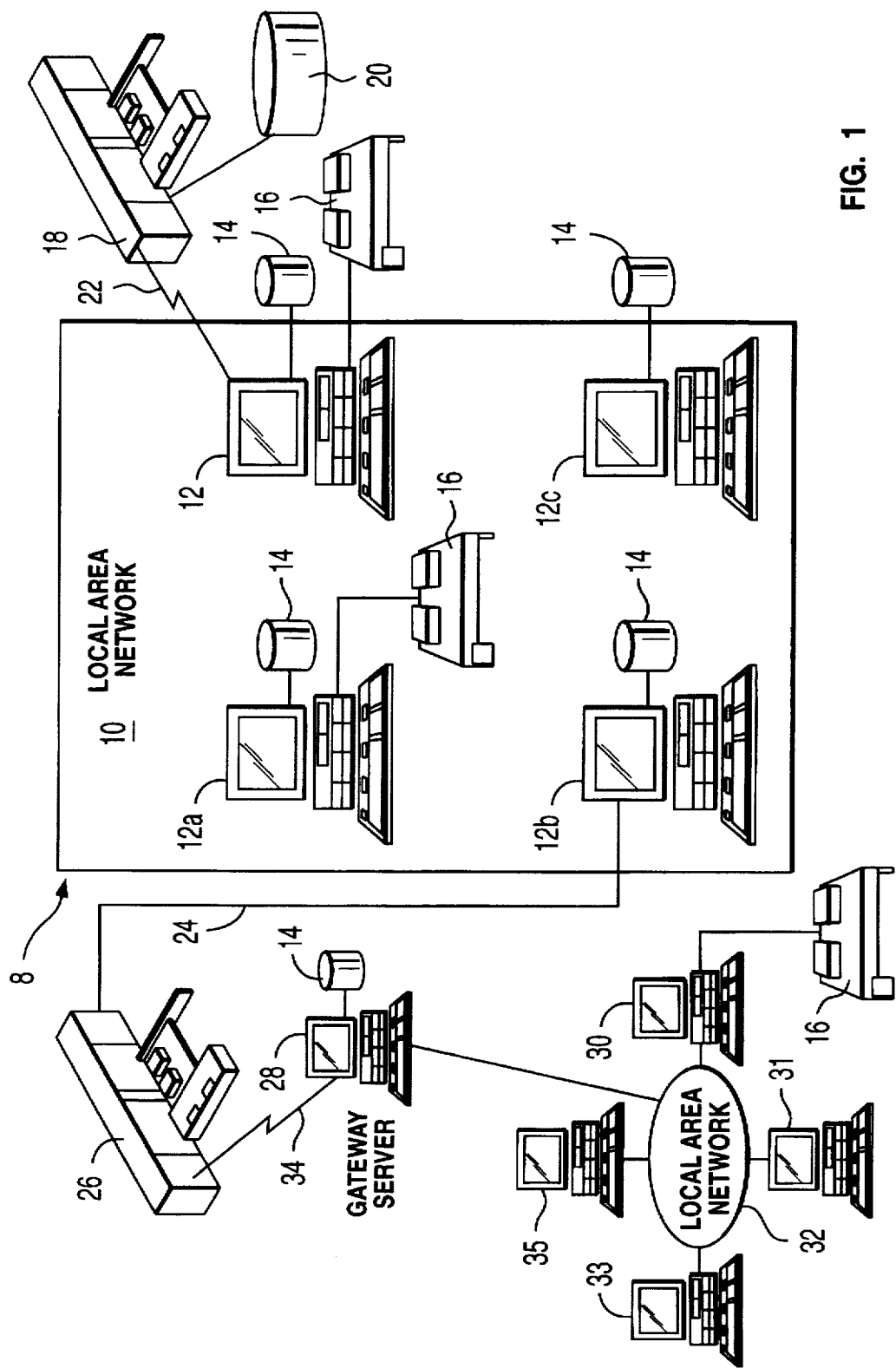
FIG. 1 is a block diagram of a computer network in which the system and method of the invention may be advantageously employed.

With reference now to the figures, and in particular with reference to FIG. 1, there is depicted a pictorial representation of a data processing system 8 which may be utilized to implement a method and system of the present invention. As may be seen, data processing system 8 may include one or more networks, such as local area networks (LAN) 10 and 32, each of which preferably includes a plurality of individual computers 12, 12a–12c, 30, 31, 33 and 35. (Hereafter, when discussing a computer in network 32, a computer 30 will be arbitrarily referenced, although the discussion could relate to any of the computers in network 32). Computers 12 and 30 may be implemented utilizing any suitable computer such as the IBM Personal System/2 (also called a "PS/2") computer or an IBM RISC SYSTEM/6000 computer, both products of International Business Machines corporation, located in Armonk, N.Y. ("RISC SYSTEM/6000" is a trademark of International Business Machines Corporation, "Personal System/2" and "PS/2" are registered trademarks of International Business Machines Corporation). Of course, those skilled in the art will appreciate that a plurality of intelligent work stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store objects, such as documents, resource objects, or executable code, which may be periodically accessed by any user within data processing system 8. In a manner well known in the prior art, each such object stored within a storage device 14 may be freely interchanged throughout data processing system 8 by transferring an object to a user at an individual computer 12 or 30, for example.

Still referring to FIG. 1, it may be seen that data processing system 8 also may include multiple mainframe computers, such as mainframe computer 18, which may be preferably coupled to LAN 10 by means of communications link 22. Mainframe computer 18 may be implemented utilizing an Enterprise Systems Architecture/370 (also called an "ESA/370") or an Enterprise Systems Architecture/390 (also called an "ESA/390") computer available from IBM. Depending on the application a mid-range computer, such as an Application System/400 (also called an "AS/400"), may be employed. "Enterprise Systems Architecture /370", "ESA/370", "Enterprise Systems Architecture/370", and "ESA/390" are trademarks of IBM; "Application System/ 400" and "AS/400" are registered trademarks of IBM; "Application System/400" and "AS/400" are registered trademarks of IBM. Mainframe computer 18 also may be coupled to a storage device 20 which may serve as remote storage for LAN 10. Similarly, LAN 10 may be coupled via communications link 24 through a subsystem control unit/ communications controller 26 and communications link 34 to a gateway server 28. Gateway server 28 is preferably an individual computer or IWS which serves to link LAN 32 to LAN 10.

As discussed above with respect to LAN 32 and LAN 10, objects may be stored within storage device 20 and controlled by mainframe computer 18, as Resource Manager or File System Manager for the stored objects. Of course, those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within Texas and mainframe computer 18 may be located in New York.

Figure 2:
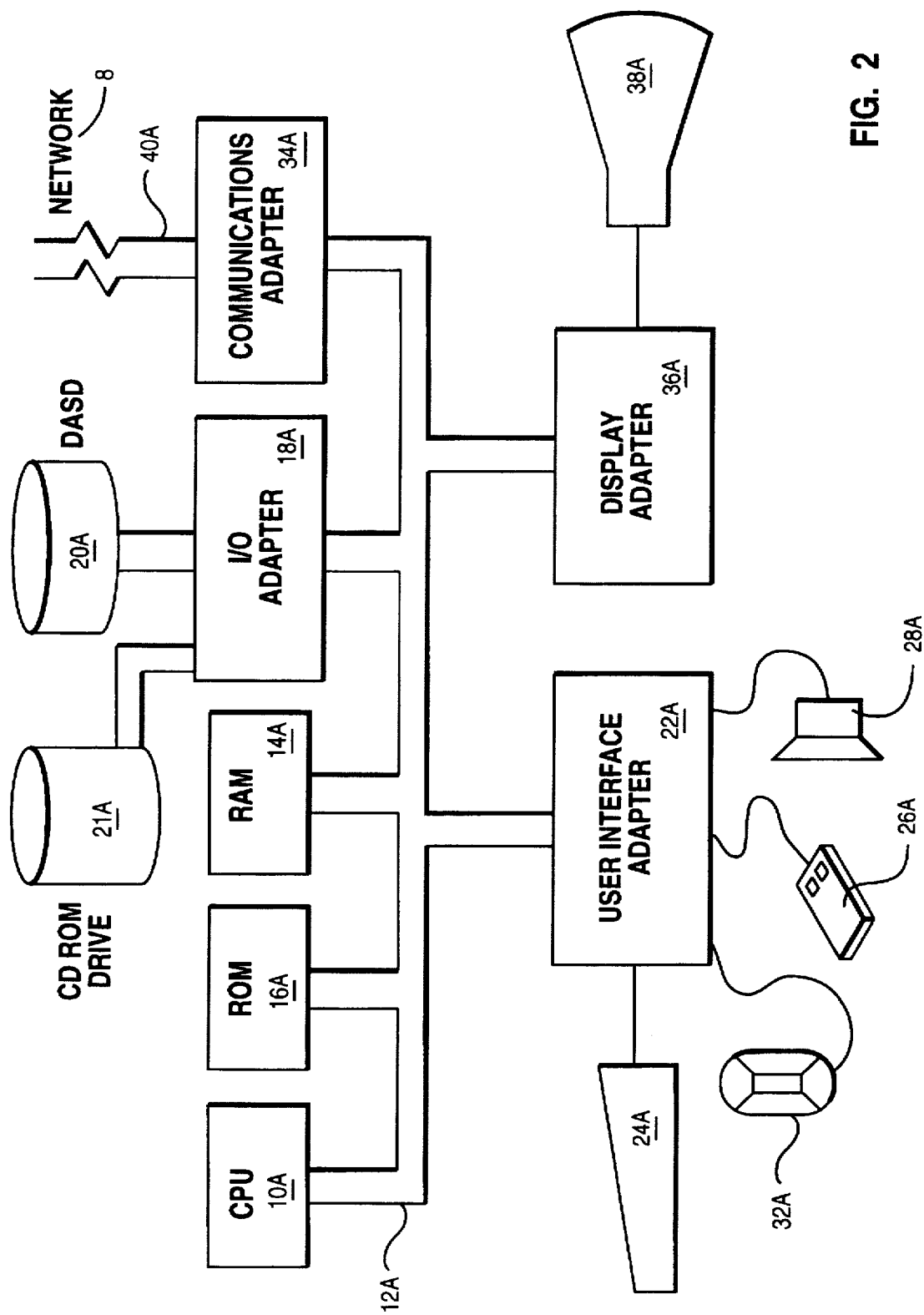
FIG. 2 is a more detailed block diagram of a representative one of the computer systems in the network of FIG. 1.

Referring now to FIG. 2, a more detailed representation of one of the computers such as computer 12 of the system 8 of FIG. 1 in which the system and method for creating and maintaining CD ROM clients effectively in accordance with the invention.

The system comprises a CPU 10A, read only memory (ROM) 16A, random access memory (RAM) 14A, I/O adapter 18A, user interface adapter 22A, communications adapter 34A, and display adapter 36A, all interconnected via a common address/data/and control path or bus 12A. Each of the above components accesses the common bus utilizing conventional techniques known to those of ordinary skill in the art, and includes such methods as dedicating particular address ranges to each component in the system, with the CPU being the busmaster. Other conventional techniques known to those of ordinary skill in the art employed in the system of FIG. 2 include direct memory access (DMA) used to transfer data at high speed from external devices such as DASD 20A or the network or the network shown to the data processing systems's RAM 14A. As is further shown in FIG. 2, these external devices such as DASD 20A and CD ROM drive 21A interface to a common bus 12A through respective adapters such as I/O adapter 18A. Other external devices, such as the display 38A similarly use their respective adapter such as display adapter 36A to provide data flow between the bus 12A and the display 38A or other device. Various user interface means are provided for interconnection and use with the user interface adapter 22A which, in the figure, has attached thereto representative user input devices such as a joy stick 32A, mouse 26A, keyboard 24A, and speaker 28A. Each of these units is well known as such and accordingly will not be described in detail herein.

The invention admits to implementation on essentially any computer system such as the RS/6000™, workstations and personal computers of the IBM Corporation executing the AIX™, OS/2™, DOS or other appropriate operating system(s) either alone or together, or similar machines of other vendors either standalone or in networks and executing one or more operating systems.

Each such computer will have, in accordance with the invention, at least two storage devices. The first (such as drive 21A) will preferably have the characteristic that it includes easily readable and removable media (such as a CD, tape, etc.) and that such media will store portions of code (such as operating system parts) which the user typically would not have a need or desire to alter or have a local copy of. Such media may, from time to time, also include yet other code which, in fact, may be desirable to download onto the client's hard drive(s) because it is pertinent essentially only to particular client(s) and not generic to operation of clients generally on the network.

The second storage device (such as DASD 20A or other form of hard drive(s), etc.) would be intended to store local, user customizable files and thus, unlike the first storage system, must be writable.

Although in a typical embodiment of the invention, a CD ROM drive, and hard drive with operating system components stored on a CD are depicted, the invention is not intended to be so limited just to operating system code being the code remaining on the first storage or even that the first storage and second storage only be limited to a CD ROM drive and hard drive, respectively. Thus, code other than operating system code may have components and aspects requiring installation of portions thereof and modification of the hard drive(s) and other components and aspects generic to multiple clients and the network which would remain solely on the CD or read-only media and not require modification of the hard drive(s). Moreover, the CD ROM drive could take the form essentially of any storage device wherein writes from the client are not normally encountered or required. Thus the reference to a "CD ROM" client is for convenience and not intended to be limiting in any way. Similarly the hard drive could be any of a number of devices permitting writes by the client.

Figure 3:
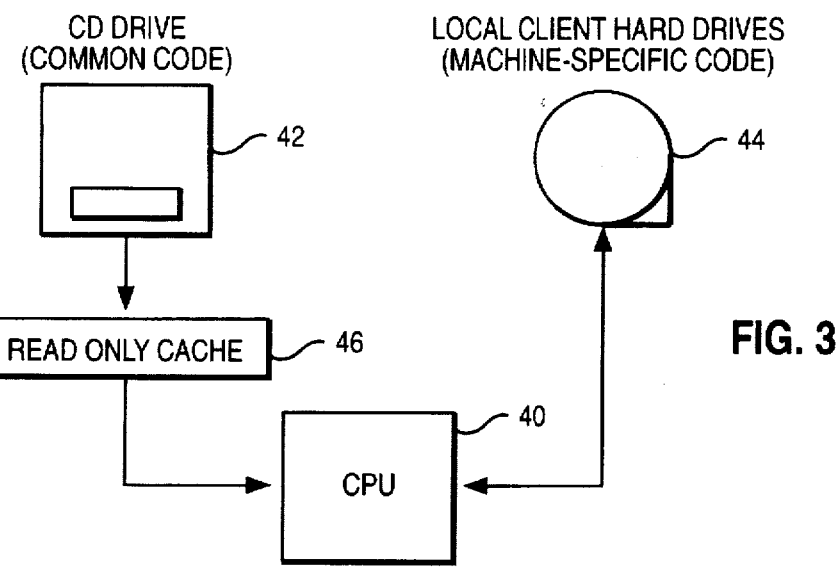
FIG. 3 is another simplified block diagram of one of the computers of the network of FIG. 1 with which the invention may be employed.

Referring now to FIG. 3, depicted therein is a simplified block diagram of a representative CD ROM client machine created in accordance with the invention. A plurality of these will comprise the computers in the network(s) of FIG. 2 as previously described. The CD ROM client shown in FIG. 3 includes a conventional CPU function 40, and the two ancillary storage devices, namely a CD ROM drive 42 and local client hard drive(s) 44. With respect to the CD ROM drive 42, a read only cache 46 is preferably included, depending upon the throughput, access time of the drive, 42, etc..

Still referring to FIG. 3, it is an important feature of the invention to note the distinction on some of the types of files and information stored on the CD drive 42 as compared to what is stored on the client hard drive 44. More particularly, the CD ROM drive is intended to store and deliver to the CPU 40 through the read only cache 46 (but not for storage on the hard drive(s)) common operating system code required by all clients in the network, e.g., /USR, /share, etc. code. In contrast, however, the local hard drive(s) 44 of each client is intended to be the repository of client machine-specific code such as the /USR/username code which is unique to each particular client machine. The latter would thus include local configuration files, etc.

As will be hereinafter detailed, each client machine such as that shown in FIG. 3 will have associated with it a CD ROM intended to be inserted and run in the CD ROM drive 42 of the client and kept with the machine. When a CD ROM client machine is first created, this particular CD ROM will contain the operating system code necessary to create the CD ROM client. When the operating system(s) for the client is updated, however, (e.g., with new functionality, a new version or point release, bug fixes, etc.), these upgrades or updates will be provided in a new CD ROM distributed to each client station of FIG. 3. As will be described in greater detail regarding operation of the client machine installation/ maintenance subprogram of the invention, when this updated CR ROM is running in the CD ROM drive 42, during boot time it will be determined if the CD ROM now running is essentially the same as the previous CD ROM, in which case the boot process will simply complete and the client station will be up and running.

However, in such a determination, if it is determined that an upgrade of the operating system code is present in this new CD ROM, client machine-specific code may be copied from the CD ROM to the client hard drive 44. Common operating system code generic to multiple CD ROM clients will nevertheless remain on the CD to be accessed by the particular client's CPU 40. Unnecessary loading of the client hard drive 42 in the manner of the prior art with generic operating system code (which might otherwise more fruitfully be retained on and accessed only from the CD ROM drive 200) is thereby avoided.

Figure 4:
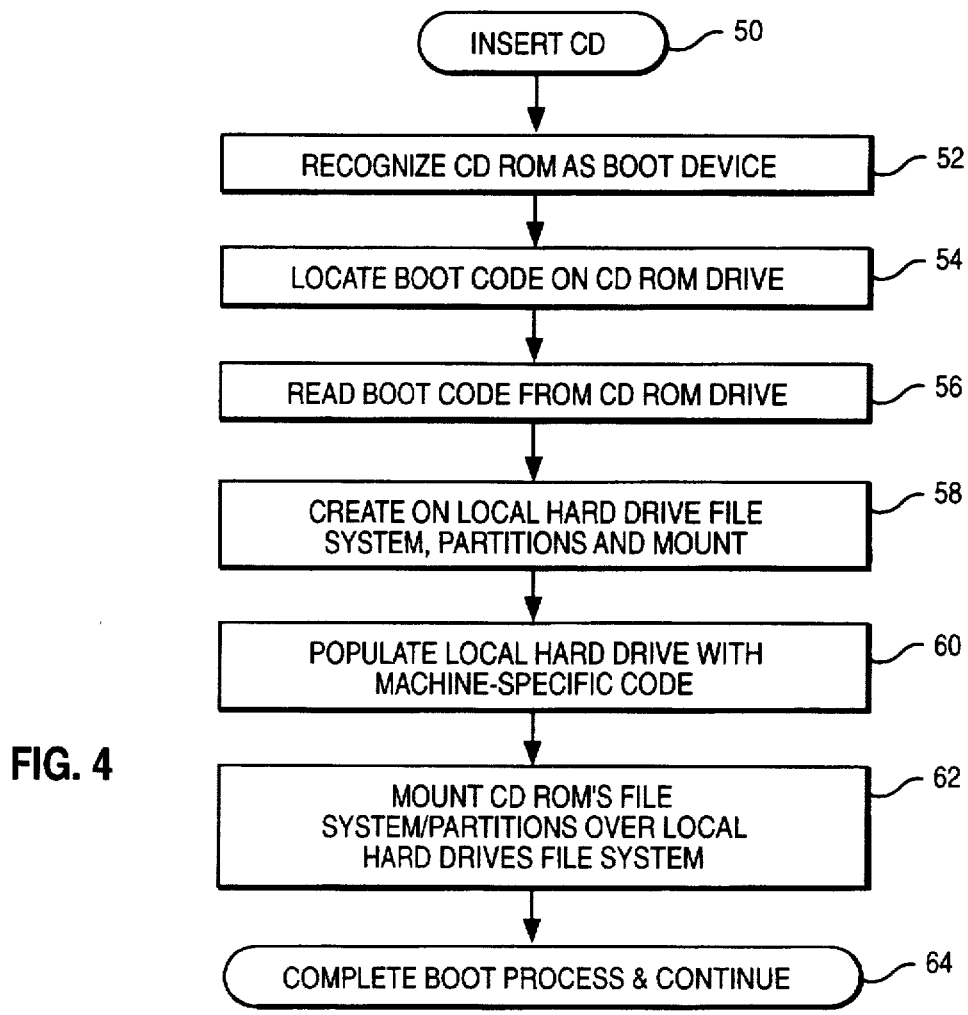
FIG. 4 is a flow diagram indicating the initial operating system install process in a client for creating a CD ROM client in accordance with the invention.

Turning now to FIG. 4, this figure illustrates a flow diagram of the initial install process for a CD ROM client of FIG. 3 wherein the CD ROM client is initially created. It is thus assumed that is simply desired to create a clone representative client machine such as in a network for an initial user and thus it is further assumed that essentially the client is "bare" with no operating system or application code installed in the hard drive 28.

During the install process, a CD is inserted, 50, in the CD ROM drive 21A. Such CD would of course contain the operating system code which it is desired for the client to operate. It is typical in hardware such as the computer system of FIG. 2 to include initial program load or "IPL" "ROS" code in firmware to initially boot the machine so that it may thereafter seek out and load the additional necessary boot code. Thus, upon the initial insertion of the CD and powering up of the machine, the hardware IPL ROS will recognize that in the initial configuration of the machine that the CD ROM drive 21A was designated as the boot device, 52. Typically choices for a device which can provide the initial boot code as the boot device which may be specified in the IPL ROS are a tape drive, diskette drive, hard drive, or compact disk drive.

Once the CD ROM has been recognized as the boot device, 52, the computer system thereafter searches for the appropriate boot code on the CD ROM drive, 54, and then reads this boot code information from the CD ROM, 56.

The client computer system thereafter creates on the local hard drive 20A of the respective client, the local file system and partitions on the local hard drive(s) 20A, such as, in the UNIX environment, a directory /USR/username, and thereafter mounts these file systems (e.g., makes them thereafter accessible to the client), 58.

The initial install process then continues with the population from the CD and user input of the thus-created local file system with local files, 60, e.g., customized, machine-specific files and information which are unique to the client. These would include local configuration data (e.g., names of drives, size of memory, peripheral devices attached such as printers, reboot information, TCP/IP addresses, logical volume manager information, etc.). In the UNIX environment these might be recognized for example, as RCBOOT, RCTCPIP (a shell script called by RCBOOT to start the machine) INETD, etc. In a DOS or windows environment, this type of code might, for example, be the familiar SYS.INI file, path statements in a configuration file such as C:\:, etc.

The initial install procedure will then continue with the mounting, 62, of the CD ROM's (21A) file systems and partitions (e.g., the root, /USR, etc.) over the previously created customized user client files (e.g., in a UNIX context, for example, /USR/username, etc.) which were previously created on the local hard drive 20A as per step 58. In the DOS environment, for example, this step would include ensuring that the CD ROM drive 21 is accessible by, typically, specification of the D: drive specification which is typically reserved for CD ROM drives.

Finally, the boot process will continue, 64, until completion, thereby creating the desired CD ROM client. It is important to note in accordance with the teachings of the invention that during the aforementioned initial install process, any actual common operating system etc. code which would be common and utilized by multiple clients would not be installed on the local hard drive(s) 20A, but would remain resident on the CD ROM for access from the CD ROM drive 21A (utilizing, as desired, read only cache technology 46 of FIG. 3). In this manner, the system of the invention avoids cluttering up the client hard file 20A, which represents valuable read-write storage space, with generic information generic to the operating system in general which has no need of being installed on the client's hard file 20A.

Figure 5:
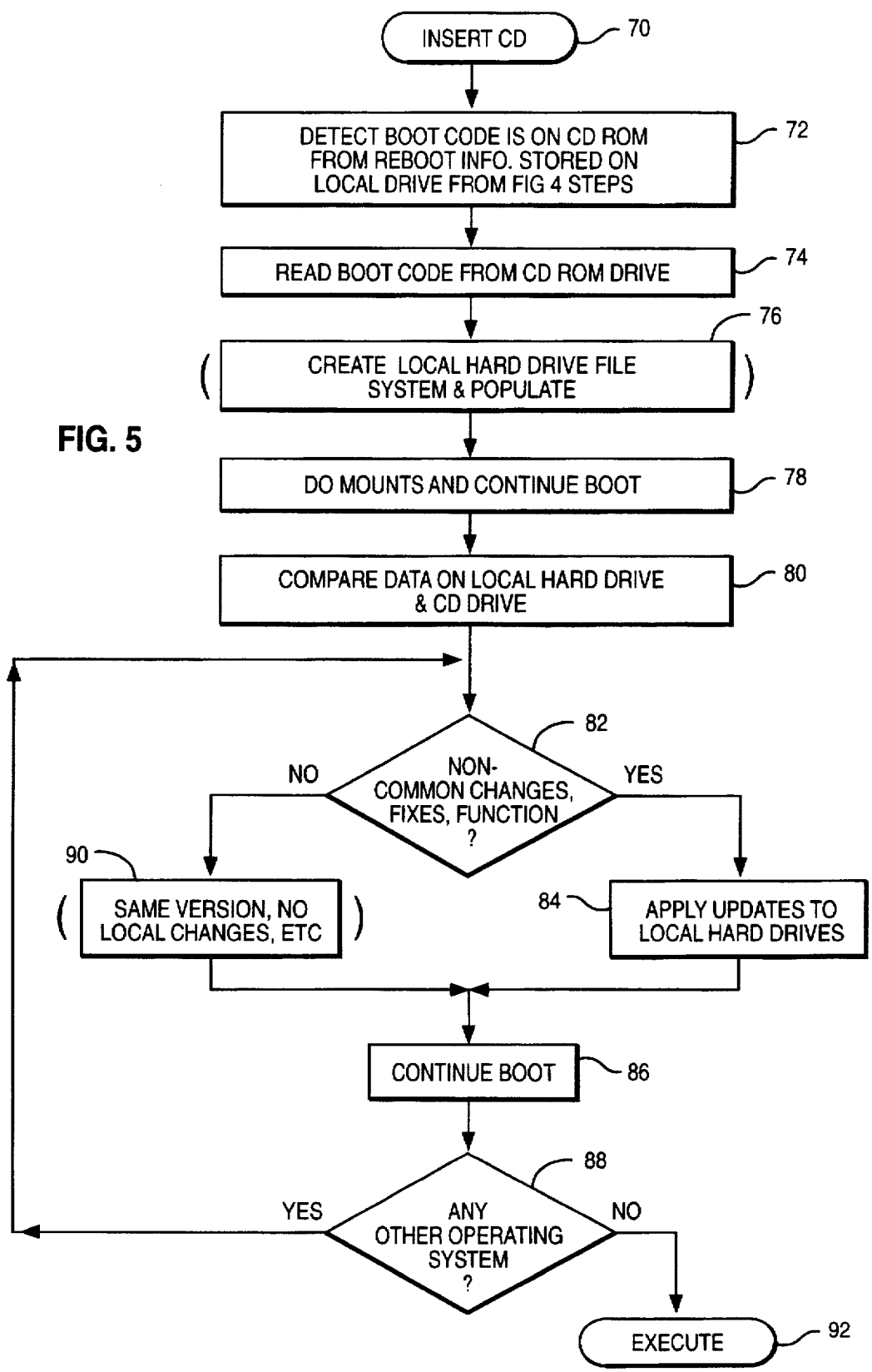
FIG. 5 is a flow diagram indicating the process for effecting an update of the CD ROM client of FIG. 3.

Turning now to FIG. 5, it will be assumed that a CD ROM client station has been installed as per the process outlined in FIG. 4. The purpose of FIG. 5 is to illustrate a flow diagram to indicate the operation of the system of FIG. 1 by CD ROM clients thus created or initially installed as per the process of FIG. 4 (e.g., after such an installation process when the client system is again booted and operated with a CD ROM present in the CD ROM drive). It will be first assumed that the CD ROM now present in the CD ROM drive differs from that previously used in the install process of FIG. 4. More particularly, it will be assumed that it differs because the network administrator or individual responsible for ensuring the currency of CD ROM stations will have produced and delivered a new CD ROM to the clients because of availability of a new operating system version, fixes, etc.—essentially any new function or code which would be desired for changing the operating environment of the client.

Thus, referring to FIG. 5 in more detail, again, as per FIG. 4, it is assumed that this CD has been installed by the client machine user in the CD ROM drive 21A, shown by reference numeral 70. Again, as per FIG. 4, the client will then detect from the reboot information previously stored on the local hard drive 20A that boot code is on the CD installed in the CD ROM drive 21A which is the boot device, 72. Accordingly, the boot process will continue from code on the CD ROM, 74.

As per FIG. 4, in this scenario it will be recalled that the local hard drive 20A has already been partitioned and organized with a file system, and mounted and populated with installed files. Thus, this step 76 is shown parenthetically in FIG. 5 to indicate that if the process in progress is an update, this step will already have been done in the initial install of FIG. 4.

Continuing with FIG. 5, the system will then proceed to continue booting and to perform the mounts, 78, whereupon information on the local hard drive 20A is compared with information on the CD ROM drive 21A, 80. As a result of this comparison it is determined whether a new operating system version, fixes, function, etc., that would change the client environment are present on the CD ROM such that it would be necessary to further populate or alter the local hard drive 20A. This is shown as step 82. In response to this query, if it is in fact determined that such an update to the hard file is required by code other than common generic operating system code, the decision path to the right of block 82 is followed, whereupon these localized file updates are performed on the local hard file 20A, reference numeral 84. If, on the other hand, at the decision block 82, the client CD ROM machine process determines that no such localized changes are required, the process exits to the left of block 82, as shown by block 90, indicating that no such changes are required. In either event, (e.g., if no localized changes are required, 90, or are required and performed, 84), the booting process continues, 86.

Next, after completing the aforementioned process with respect to a given operating system, the subsystem will determine from the information on the CD ROM drive 21A if there is any code present relative to yet another operating system, 88. If so, the process will loop back to block 82 and re-perform the subsequent steps relative to this second or additional operating system. In other words, with respect to this second operating system, again if there are changes as a result necessary to be performed on the local hard drive, these changes will be made with respect to this second operating system, whereupon the process continues. When it is finally determined that there are no other operating systems which need to be addressed, 88, the process exits to the right of block 88, whereupon user applications, etc. are executed, 92, as required by the user.

As a specific example of the latter situation wherein multiple operating systems are being employed in the client computer, it may be presumed that an initial install of, for example, the OS/2™ operating system has been performed. It may also be presumed that the client CD ROM machine is also executing the UNIX operating system. If in a subsequent distribution of a CD ROM, there are changes or updates to the UNIX operating system which have implications requiring alteration of the local hard file 20A, the system at block 88 will determine that in fact this other operating system (e.g., UNIX) code is present on the CD, causing a loop back to block 82. When the client machine examines these UNIX changes, it may, for example, be determined that it is necessary locally to alter the specification of logical volumes allocated locally after figuring out the available free space on the hard drive 20A. Accordingly, as per block 84, the system will effect the application of these localized changes to the hard file 20A as a result of the presence of this code on the CD relating to the second operating system (UNIX).

While the invention has been shown and described with reference to particular embodiments thereof, it will be understood by those skilled in the art that the foregoing and other changes in form and detail may be made therein without departing from the spirit and scope of the invention.

I claim:

1. A method for configuring a client machine including a CD ROM drive and a local hard drive in a computer network, comprising:

booting said client machine from said CD ROM drive;

detecting from information stored on said local hard drive whether a version of said client machine was previously installed on said client machine;

installing on said local hard drive in response to said detecting indicating that said version was not previously installed, client machine-specific program code from said CD ROM drive; and accessing network-generic operating system program code and said client machine-specific program code from said CD ROM drive and said local hard drive, respectively; and wherein, during said installing and accessing steps, said CD ROM drive includes said network-generic program code; and wherein said network-generic program code is precluded from being installed on said local hard drive during said installing.

2. The method of claim 1 further including:

re-booting said client machine from said CD ROM drive;

detecting that said version of said client machine has been previously installed; and installing on said local hard drive, in response to said detecting indicating that said version was previously installed, additional client machine-specific program code from said CD ROM drive.

3. The method of claim 2 wherein said client machine-specific program code is resident on a first CD ROM installed in said CD ROM drive during said booting.

4. The method of claim 3 wherein said additional client machine-specific program code is resident on a second CD ROM installed in said CD ROM drive after said first CD ROM is installed.

5. The method of claim 4 wherein said network-generic operating system program code is comprised of first operating system program code, and wherein said method further includes the steps of:

detecting from said CD ROM drive presence of network-generic operating system program code comprised of second operating system program code; and wherein said method further includes the steps of:

installing on said local hard drive in response to said detecting presence of said second operating system program code further client machine-specific program code from said CD ROM drive with said second operating system program code being precluded from being installed on said local hard drive during said installing of said further client machine-specific program code.

6. An apparatus for configuring a client machine including a read only memory drive and a local hard drive in a computer network, comprising:

means for booting said client machine;

means for detecting whether a version of said client machine was previously installed on said client machine;

means for installing on said local hard drive in response to said detecting indicating that said version was not previously installed, client machine-specific program code from said read only memory drive; and means for accessing network-generic program code and said client machine-specific program code from said read only memory drive and said local hard drive, respectively.

7. The apparatus of claim 6 wherein said booting is from said read only memory drive.

8. The apparatus of claim 7 wherein said detecting is from information stored on said local hard drive.

9. The apparatus of claim 8 wherein, during said installing and accessing, said read only memory drive means includes said network-generic program code; and wherein said apparatus further includes means for precluding said network-generic program code from being installed in said local hard drive means during said installing.

10. The apparatus of claim 9 wherein said network-generic program code is network-generic operating system program code.

11. The apparatus of claim 10 wherein said read only memory drive means includes a CD ROM drive.

12. The apparatus of claim 11 further including:

means for re-booting said client machine from said ROM drive;

means for detecting that said version of said client machine has been previously installed; and means for installing on said local hard drive, in response to said means for detecting indicating that said version was previously installed, additional client machine-specific program code from said read only memory drive.

13. The apparatus of claim 12 wherein said client machine-specific program code is resident on a first CD ROM installed in said read only memory drive means during said booting.

14. The apparatus of claim 13 wherein said additional client machine-specific program code is resident on a second CD ROM installed in said read only memory drive after said first CD ROM is installed.

15. The apparatus of claim 14 wherein said network-generic operating system program code is comprised of first operating system program code, and wherein said apparatus further includes:

means for detecting from said read only memory drive presence of network-generic operating system program code comprised of second operating system program code; and wherein said apparatus further includes:

means for installing on said local hard drive means in response to said means for detecting presence of said second operating system program code further client machine-specific program code from said read only memory drive means with said second operating system program code being precluded from being installed on said local hard drive means during said installing of said further client machine-specific program code.

* * * * *